United States Patent [19]
Relue et al.

[11] 3,827,639
[45] Aug. 6, 1974

[54] DRYING CHAMBER APPARATUS

[76] Inventors: James G. Relue, 6015 Granville Dr., Sylvania, Ohio 43560; Weston C. Jones, 3423 Muirfield Ave., Toledo, Ohio 43614

[22] Filed: Apr. 26, 1973

[21] Appl. No.: 354,835

Related U.S. Application Data

[62] Division of Ser. No. 215,355, Jan. 4, 1972.

[52] U.S. Cl................ 239/552, 239/568, 34/156, 226/97
[51] Int. Cl......................................... B05b 1/14
[58] Field of Search ......... 226/7, 97; 239/568, 552; 34/154, 156

[56] References Cited
UNITED STATES PATENTS

| | | |
|---|---|---|
| 3,434,668 | 3/1969 | Boling ........................ 239/568 X |
| 3,543,410 | 12/1970 | Trachtenberg .................. 34/156 |
| 3,606,974 | 9/1971 | Steele ............................. 239/568 |
| 3,711,960 | 1/1973 | Overly ............................. 226/97 |

*Primary Examiner*—Allen N. Knowles
*Attorney, Agent, or Firm*—Staelin & Overman; Paul F. Stutz

[57] ABSTRACT

Method and apparatus for heat drying a continuous strand material by the expedient of exposing a moving array of individual strand material to blasts or jets of the heating medium as enhances accomplishment of the drying while simultaneously supporting said strand material.

13 Claims, 6 Drawing Figures

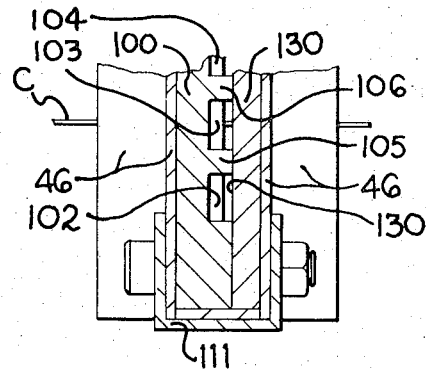
FIG. 4
FIG. 3
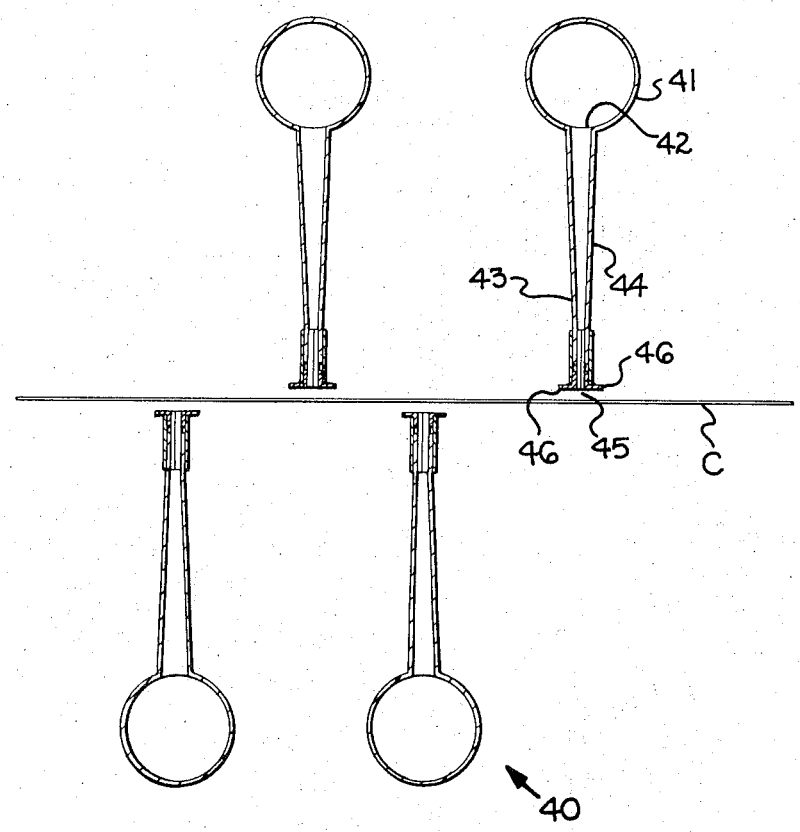

DRYING CHAMBER APPARATUS

This is a division of application Ser. No. 215,355, filed Jan. 4, 1972.

The present invention relates to a novel method and novel apparatus for accomplishing drying and, in a preferred embodiment, partial curing of an elastomeric coating and impregnant material carried by and in a continuous length of gathered-together strands of glass filaments.

There are a number of known methods and apparatus for accomplishing drying or heating of a variety of substances.

Unfortunately, the present commercially available ovens have not been found to be particularly adapted for the application under consideration.

The present invention is concerned with drying continuous cord structures formed of a plurality of gathered-together strands or yarns, each of which are formed of a large number (usually 200 or more) filaments of continuous glass fibers bearing an impregnant coating formed of a vulcanizable elastomeric material.

The continuous cords or bundles formed of the gathered-together plurality of strands, each in turn formed of a multiplicity of filaments, are potentially useful as reinforcement members in a variety of vulcanized elastomeric rubber products such as belts, tires, etc.

Glass as a reinforcement for rubber, however, presents an anomalous situation in that while it possesses very desirable characteristics and properties, it also possesses characteristics and properties which differ quite significantly from the conventional textile reinforcement materials more commonly and historically used in the reinforcement of rubber. These conventional textiles, e.g., the natural occurring and synthetic materials, of course, have their own shortcomings which are well known in the art and will not be gone into in detail herein.

As indicated, glass as a candidate reinforcement for annular bodies possesses a number of desirable properties. For example, a glass filament (a) possesses essentially 100 percent elasticity, (b) demonstrates essentially no yield under stress, (c) demonstrates excellent dimensional stability and (d) is virtually immune to change in atmospheric conditions, principally moisture and, as well, heat. On the other hand, glass is quite stiff when compared to the conventional organics. Numerically, glass has a stiffness of 322 grams per denier (gpd) while nylon ranges from 18-23 gpd, polyesters range from 11-21 gpd, the acrylics such as ACRILAN and ORLON range from 7-10 gpd, viscose rayon varies from 11 to about 25 gpd. The low breaking elongation of glass frequently presents some problems. Thus, the value of glass is 3-4 percent whereas the polyesters range from 19-30 percent, nylon ranges from 16-40 percent, the acrylics from 36-40 percent, viscose rayon from 9-30 percent. Glass also has a high specific gravity measuring 2.54 compared to 1.14 for nylon, 1.5 for rayon and from 1.22 to 1.38 for the polyesters such as KODEL and DACRON. Additionally, glass has a toughness value of 0.07 on a denier basis compared to nylon's 0.75, rayon's 0.20, DACRON polyesters' 0.5 and acrylic ORLON's 0.4. In addition, of course, glass can be its own worst enemy in that glass to glass contact leads to filament deterioration. It can be appreciated from the foregoing that any contemplation of the use of glass as a reinforcement must proceed on the basis of a consideration of those quite different properties entailing therefore the necessity of special treatments such as impregnant coatings in order to allow the taking advantage of the desirable properties and the overcoming of the unusually different characteristics and properties so that the glass can serve as an effective and, in some ways, a superior reinforcement.

Thus, it has been determined that in order for glass to be successfully utilized as an interiorly disposed reinforcement for rubber goods, the individual elements need be protected from adjacent filaments. This protection can be afforded by treatment with a size and also frequently by a particular impregnant or a combination size and impregnant material.

It has been found in accordance with the present invention that the impregnation coating of continuous cords, each formed of a multiplicity of strands and yarns gathered together, can be accomplished in a most efficient manner when conducted in accordance with the procedures as generally outlined hereinafter.

A further problem encountered in the attempts to employ glass as a reinforcement resides in the fact that the processing of the glass, e.g., size and impregnation treatments, necessarily involves the movement of the glass as individual filaments, as strands, as yarns or as cords; which movement very frequently causes damage to the glass surface due to contact with conveying equipment or adjacent glass elements. As a consequence, the ultimate impregnated cord assembly demonstrates unsatisfactory properties when tested as such or when embedded in an elastomeric product.

Thus, physical contact of the strands, yarns and cords before, during and after impregnation should be kept to a minimum. Particularly just following impregnation, the cord is vulnerable to removal of impregnant coating by any abrasion.

Initial efforts at impregnating glass strand in the form of bundles and cords found lack of success in achieving a uniform drying on any sort of commercial scale. In the first place, the impregnant material composed of an elastomeric component is reasonably viscous, having a consistency of in the neighborhood of a cream or a light molasses. Exposure of the cord or bundle of assembled glass strands bearing the combined impregnant and coating to heat results in the formation of what may be described as a skin. The skin is probably a partially cured outer region which has been first leached of water, resulting in a layer of higher solids giving somewhat the appearance of a skin. The skin serves as a barrier or insulation which inhibits drying of the impregnant beneath the skin and particularly in the interstitial voids between the assembled together filaments and strands. Significantly, the technique of the present invention provides efficient drying and efficient partial vulcanization of the elastomeric components of the impregnant located within the interstitial voids, as it were, created by the spacing between adjacent strands, yarns and filaments, while at the same time achieving a partial vulcanization of the impregnant which is in the nature of a surrounding coating.

Generally, it has been found desirable in the accomplishment of impregnation, and particularly of drying and partial vulcanization, to arrange a plurality of the cords in generally mutually parallel, horizontal array so that the cords or bundles can be moved axially in a plurality of mutually parallel paths horizontally through an oven or heat chamber. Upon emergence from the oven, they are wound upon suitable winder or drum winder mechanisms as are conventionally employed in the textile art. It is important, of course, that drying be completed before winding the impregnated strands or cords upon themselves, otherwise the adjacent courses of cords will become likely adhered or cohered to adjacent winds of the impregnated cord, leading to difficulties in the unwinding of the cord for further processing or for being formed into later assemblies, either woven or nonwoven. Unfortunately, it has been found that in the movement of the cords through the drying stage in large numbers, ranging up to 30–75 individual cords in side-by-side, mutually parallel relationship, that occasionally one or more of the cords become broken from time to time. In most of the conventional furnaces or ovens, the broken end, being pulled through the oven, finds itself being whipped laterally to and fro across adjacent cords or bundles on either side. In fact, under certain conditions, the end will whip itself from one side to the other whereby all of the adjacent cords are disturbed and, in many cases, injuriously by the contact with the broken end. The injury can take the form of disruption or disturbance of the continuity of the coating of the impregnant about the exterior region of the cord and, in more serious cases, can involve actual surface damage by the glass in the broken cord with the glass in the adjacent cords, recognizing that glass-to-glass contact can be the most damaging of all.

Having in mind the preceding introduction, it is an object of the present invention to provide a novel method and apparatus for accomplishing impregnation and heat drying of glass cords and bundles on a continuous bases and which permits attainment of the desirable properties without many of the problems usually associated in impregnation and drying known heretofore.

It is a particular object of the present invention to provide a method and apparatus which permits the attainment of impregnation, coating and controlled partial vulcanization and drying in a minimum of time or, in other words, at reasonably high rates of speed whereby the economic factors are more favorble in terms of production feasibility.

It is a particular object of the present invention to provide a novel drying and partial vulcanization technique which embodies features of construction which obviates or at least substantially reduces the necessity of physical contact of the cords, made up of assembled yarns and strands, with auxiliary handling of equipment such as guide members, etc.

It is a special object of the present invention to provide a technique as herein described which overcomes the problem generally encountered as alluded to above and referred to as the insulating boundary layer problem. This generally is accomplished by the high velocity creating a distrubance of the insulating boundary layer.

It is still a further object of the present invention to provide a drying arrangement which includes provisions which inhibit and essentially eliminate the phenomena of end whip with respect to any broken cord assemblies in the passage thereof through the heating chamber, furnace or oven.

It is likewise an object of the present invention to provide a method and particular apparatus, coupled with control techniques therefor, which permit substantial elimination of the tendency for products resulting from evaporation, vulcanization and drying to pass to the outside of the oven or chamber whereby they become objectionable to personnel working in the vicinity. To the contrary, by the proper operation of the furnace or heating chamber of the present invention, air surrounding the chamber, oven or furnace is maintained essentially uncontaminated by the presence of any of the products of the drying or partial curing or partial vulcanization of the impregnated material carried by the cord passing therethrough.

It is still another object of the present invention to provide a method and apparatus permitting accurate control of the temperature therewithin in order that the drying rate and vulcanization or partial vulcanization rate or curing rate can be controlled within reasonably close limits so that the ultimate properties of the impregnated cord or bundle can be similarly held within reasonably accurate tolerances.

The above enumerated objects, as well as other objects of the present invention, will become apparent to those skilled in the art from the following detailed description taken in conjunction with the annexed sheets of drawings, on which there is presented for purposes of illustration only, a single embodiment of the furnace or heating chamber structure of the present invention.

IN THE DRAWINGS

FIG. 3 is a partial side elevation view based upon FIG. 1 for the purpose of illustrating the relationship of the plurality of offset jet nozzle members, constituting a preferred embodiment of the present invention;

FIG. 4 is a sectional view taken on the line 4—4 in FIG. 1;

Viewed most simply, the present invention envisions apparatus and technique for subjecting, in a continuous production line fashion, a plurality of bundles, cables, cords, or a plurality of linear elements, to a drying step by the expedient of passing the strands, disposed in horizontal, closely spaced relationship, between offset alternate lower and upper jet nozzles adapted to issue vertically directed curtain-like streams of a heating medium of sufficient velocity, and the jet nozzles being of sufficient number and of appropriate spacing to maintain the mutually parallel array of elongate members in pneumatically suspended disposition between the opposed sets of nozzles carried, as it were, by the curtain-like streams. The rapidly moving medium fulfills thereby a dual function; namely, drying and, at the same time, the pneumatic or air suspension of the linear elements being subjected to drying.

Figure 1:
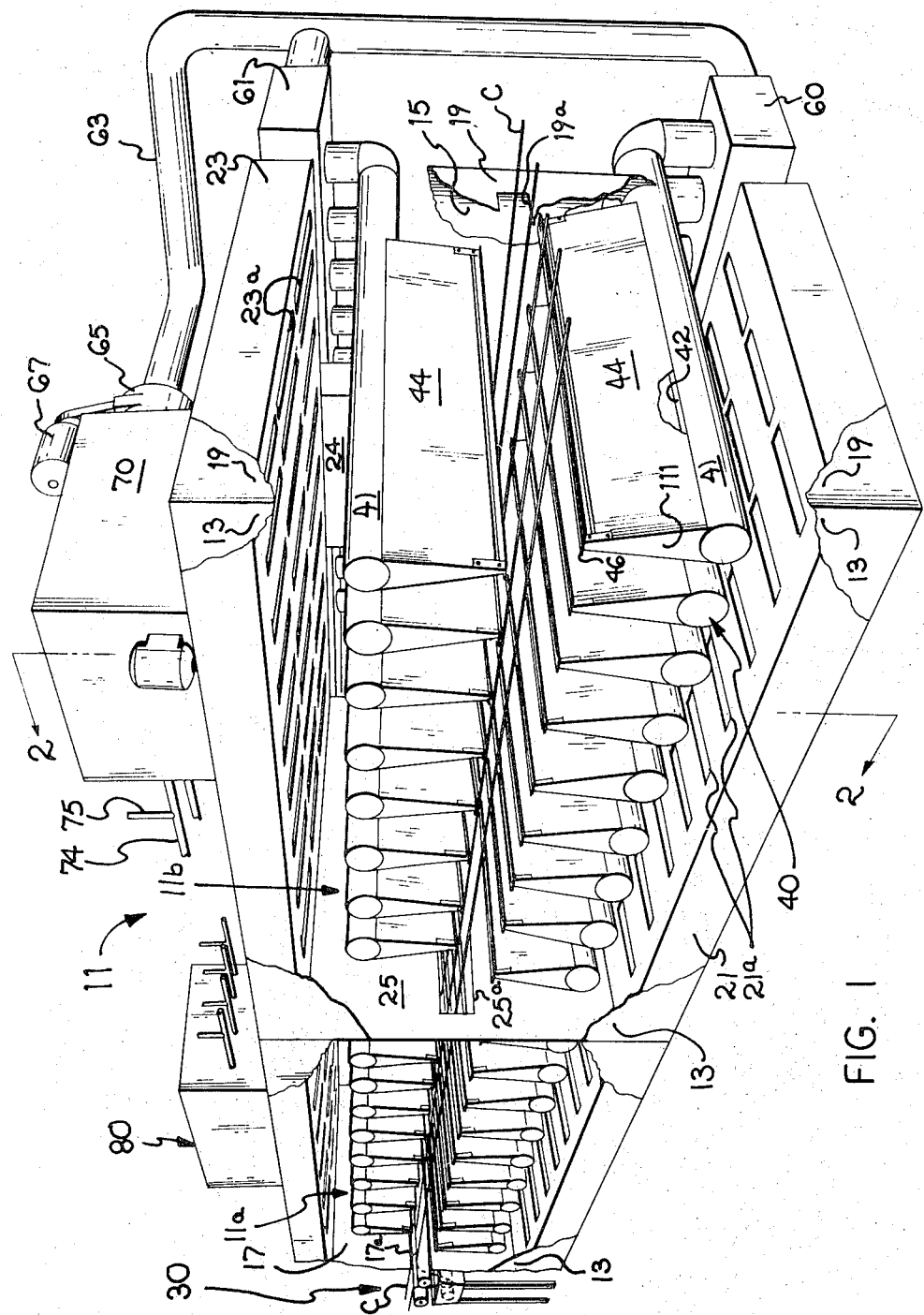
FIG. 1 is a perspective view of the segmented heating chamber or furnace shown with major perimetric walls broken away in order to show the interior structure, together with the mutually parallel arrangement of continuous glass cords or bundles moving therethrough in horizontal array from left to right.

Referring now more particularly to the drawings, there is shown in FIG. 1 a furnace 11 composed of spaced elongate side walls 13 and 15 which extend the full length of the structure as shown and horizontally spaced end walls 17 and 19 which, with side walls 13 and 15, define the complete perimeter of the overall furnace. Reference numeral 21 identifies a lower ductwork extending between all of the walls, thereby forming the bottom wall of the overall structure, while reference numeral 23 identifies an upper ductwork likewise extending between all side and end walls, thereby forming the upper wall of the overall furnace structure. Reference numeral 25 identifies a vertical interior wall which is parallel with end walls 17 and 19 and disposed generally midway therebetween to define the furnace chamber into a fore chamber 11a and an aft chamber 11b.

An opening of horizontal extend 17a in end wall 17 defines an inlet for a plurality of mutually parallel, side-by-side cords, identified by the reference letter C. A similar opening 25a in vertical midwall 25 serves as an access opening, permitting the array of strands to pass from the fore chamber 11a to the aft chamber 11b. A horizontally extending opening 19a in end wall 19 serves as an outlet or exit for the horizontal array of strands, cords or bundles C.

As indicated, the array of bundles are shown moving from left to right. While not shown, the bundles may be visualized as each being drawn from a rotatable supply spool carried on a frame from which they pass through an array of guide eye members to dispose them in horizontal disposition. The bundles or cords then pass through the impregnation apparatus, generally identified by the reference numeral 30. The impregnation apparatus will not be described in detail since it is simply a horizontal tank and an arrangement of guide rollers over which the parallel array of bundles are passed proceeding down into the tank containing suitable impregnant, thence up out of the tank over a suitable wiping die and thence through the two chambered heating and drying structure, proceeding through the inlet 17a, the opening 25a, separating the fore chamber 11a from the aft chamber 11b, and thence out the outlet 19a, proceeding to appropriate tension winders such as of the type conventionally used in the textile industry and therefore not disclosed in detail herein.

Situated within the furnace and in both chambers 11a and 11b thereof are a large plurality of nozzle members of identical construction which are identified by the reference numeral 40. As can be seen in FIG. 1, the jet nozzles 40 are generally elongate structures which are disposed in parallel relationship with the end wall 17, mid wall 25, end wall 19 and themselves but with adjacent members in vertically offset staggered relationship. As a consequence, generally half of the members are disposed beneath the openings 17a, 25a and 19a and about half of them are disposed thereabove. The openings 17a, 25a and 19a define generally the path of the horizontal array of mutually parallel strands in passing through the overall furnace.

Figure 2:
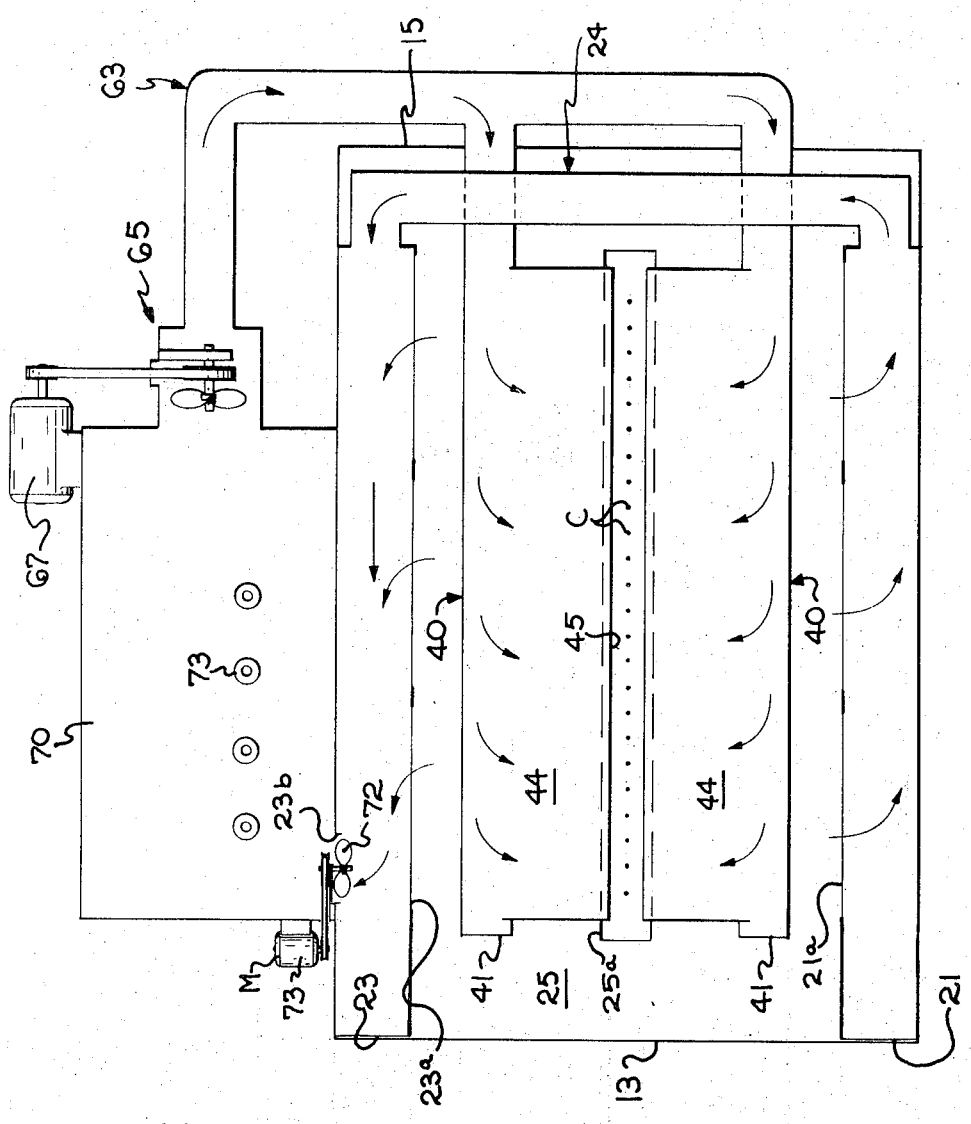
FIG. 2 is a schematic sectional view taken on the line 2—2 in FIG. 1.
Figure 5:
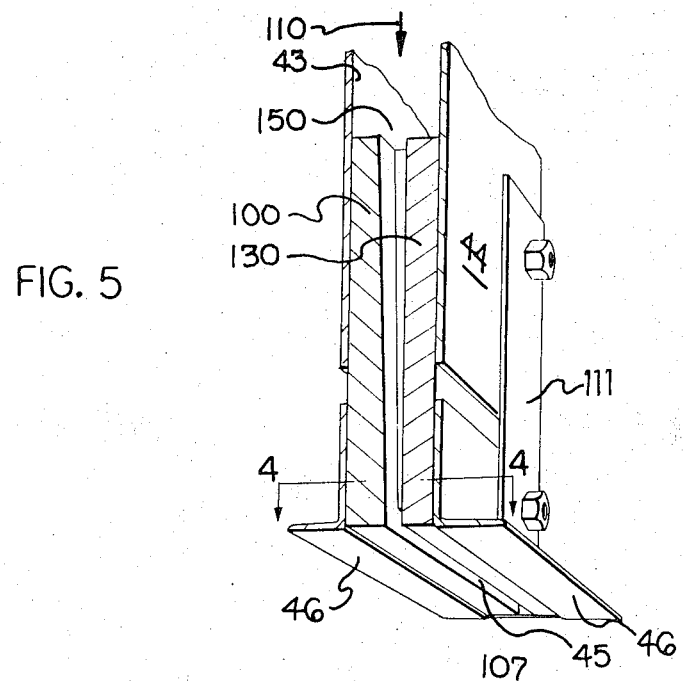
FIG. 5 is a perspective view of a segment of length of a jet nozzle assembly with parts broken away to show the relationship of the several component parts of the assembly.

Referring to FIG. 3 for a general description of the nozzle members, it may be seen that they are composed of a principal cylindrical conduit member 41 having an elongate slot opening along one side, identified by the reference numeral 42. On either side of the slot opening, a pair of walls 43 and 44 are connected sealingly to the conduit and extend therefrom in converging relationship to a slot-like outlet 45 which extends the full width of the furnace and is either aimed downwardly at the cords, in the case of those nozzle members disposed above the path of the cords, or the slot opening is disposed and inclined to aim upwardly, in the case of those jet nozzles disposed below the path of the parallel array of the cords. The nozzle members 40 each include a plurality of side-by-side throats which are defined between flushly held elongate nickel plated machined bar members 100 and 130 which are situated between the walls 43 and 44 and extend outwardly therefrom away from the conduit 41 as shown in FIGS. 3 and 5. The nature of construction of the bar members 100 and 130 is given more detailedly hereinafter. The lower cylindrical conduit components 41 each connect at one side with a manifold member 60 (FIGS. 1 and 2) which runs marginally along the bottom alongside far side wall 15. The upper nozzle members, and particularly the cylindrical conduit components 41, extend and connect individually with a manifold member 61, which is similar to the conduit 60 but disposed along the upper marginal region of side wall 15. The manifold members 60 and 61 connect with conduit 63 which extends to the burner chamber 70. Blower 65, driven by motor 67 mounted on top of the burner chamber 70, is located in conduit 63 as shown.

Bottom ductwork 21, serving in part as the bottom wall of the furnace and also as a collection means for drying air, contains a plurality of generous slot openings 21a as shown. In similar fashion, the upper ductwork 23 contains a plurality of rather generous slot openings and serves as a collection means in a manner to be described. Collection ductwork 21 and collection ductwork 23 are fluidly connected by the ductwork 24. An opening 23b (FIG. 2) connects the ductwork 23 with the burner chamber 70. A blower fan 72, driven by motor 72a mounted in opening 23b, creates the exhaust in collection means 21 and 23. Reference numeral 73 identifies burner means ideally formed of a conduit 75 for gas and connected to conduit 74 for combustion air. The flow of drying air is as follows. Heated air from the plenum chamber 70 proceeds, aided by blower 65, to conduit 63. Conduit 63 with the heated air connects with upper and lower manifold members 61 and 62. The heated air proceeds through these latter, thence to the plurality of circular conduit members 41, through the passageway defined by the converging wall members 43 and 44 and out the appropriate alternately upper and lower spaced slot openings of the individual jet nozzles. The elongate outlets of the large plurality of nozzles each create, in effect, a jet curtain of heated air. Due to the offset upper and lower positioning of the nozzles 40, the individual oppositely proceeding jet curtains of air in adjacent relationship serve to support the strands without exterior support.

Figure 6:
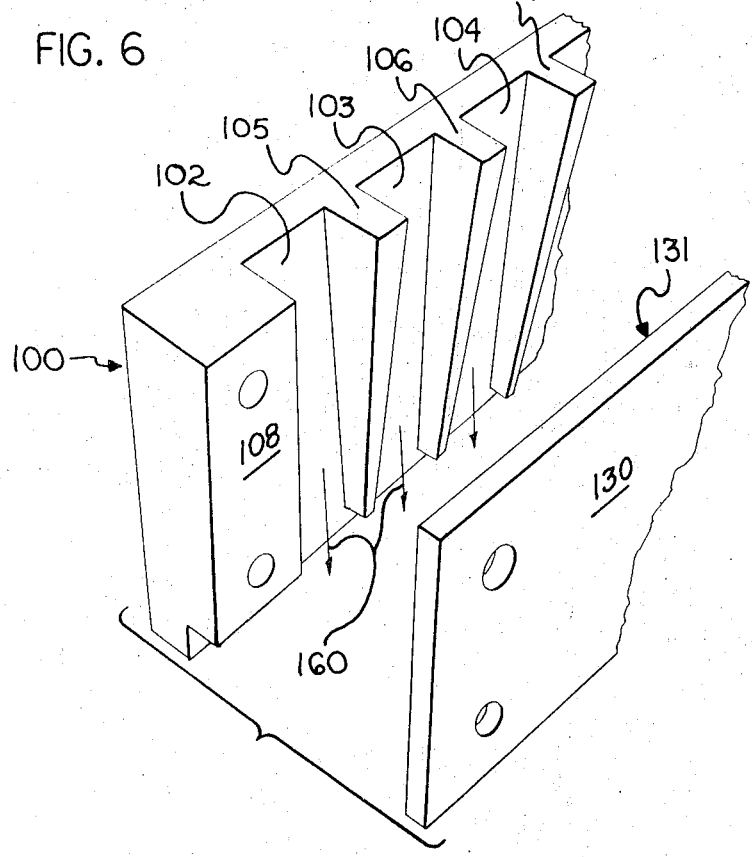
FIG. 6 is a perspective view from above of two of the principal components of FIG. 5 shown in spaced apart relationship in order to disclose interior constructional details.

As referred to earlier, the nozzle members include, sandwiched partially between the walls 43 and 44, elongate bar members 100 and 130. These latter are disclosed in more detail in FIGS. 4, 5 and 6. FIG. 6 shows these members separate from the nozzle assembly 40 and in spaced apart relationship to show their individual configuration. FIG. 5 shows in perspective these members 100 and 130 located between the walls 43 and 44 but extending downwardly beyond the lower edge of the latter. Fig. 5, which is a perspective partially sectional view of a far end of an upper nozzle 40 as seen in FIG. 1, also shows the elongate L-shaped members 46 having one leg secured on the outer surfaces of the members 100 and 130 with the other leg extending at right angles away from the members 100 and 130 on either side of the elongate slot opening 46 (FIGS. 3 and 5). Reference to FIG. 6 reveals that member 130 is essentially a flat rectangular piece which extends the full lateral length of the nozzle. The member 100 is a machined rectangular bar having a plurality of machined side-by-side grooves 102, 103, 104, etc., separated by equally spaced wedge-shaped walls 105, 106 and 107. The wall members 105, 106 and 107, as well as the end segment 108, each have a facing surface which are collectively in coplanar relationship for abutting contact with the flat facing surface 131 of the member 130. When the plate 130 is positioned with the surface 131 flushly in abutment with the coplanar surfaces referred to, there is defined a plurality of side-by-side passageways or throats extending in the direction of the arrow 110 in FIG. 5. A channel-shaped end member 111 completes the assembly 40 and is bolted thereto in the manner indicated in FIG. 5.

Looking at FIGS. 4, 5 and 6 together, it will be appreciated that air proceeding from the conduit 41 through opening 42 proceeds downwardly, as indicated by the arrow 110. Thus, FIGS. 4, 5 and 6 are views of a jet nozzle assembly 40 located in the upper region of the furnace in order to produce a downwardly proceeding curtain of air. In any event, the air proceeds convergingly between the walls 43 and 44. Finally, the air must pass into the abruptly restricted confines of the passageways machined in the member 100, since the member 130 is flushly against the coplanar faces of the wedge-shaped walls creating the passageways 102, 103, 104, etc. The entrant area of the passageways 102 and 103 is considerably less than the area between the walls 43 and 44 just above; for example, that region generally indicated by the reference numeral 150 in FIG. 5. Accordingly, the air is thusly abruptly throttled. Furthermore, in passing down the grooves or channels 102, 103, 104, etc., the air is further uniformly throttled by the gradual decrease in the cross-section area of the individual plurality of passageways (by reason of the wedge shape of separating walls 105, 106 and 107) to the final exit region proximate the flanges 46. As can be seen by reason of the shape of the wedges, the wall 102 converges toward plate 130 while the facing walls of wedges 105 and 106 diverge downwardly. By way of example, the flow of air passing out the exit slot 45 is desirably maintained in the neighborhood of 12,000 feet per minute. This represents a throttling ratio of about 3 to 1 when it is considered that the flow of air, as it passes between the converging walls 43 and 44 and approaches the region 150 in FIG. 5, measures about 4,000 feet per minute. The flow of air as it proceeds from the nozzle terminus is substantially unidirectional, as indicated schematically by the arrows 160 in FIG. 6, due to the influence of the side-by-side walls 105, 106, 107, etc. The members 100 and 130 are desirably formed of steel, which, after machining, are nickel plated to provide resistance against deformation and surface erosion by reason of the high temperatures as well as the high volumes and velocity of heated air passing through the restricted nozzles defined by the grooves in the member 100. The wedged-shaped walls 105, 106, etc., defining the side-by-side converging passageways or throats, serve to create uniformly downwardly and uniformly upwardly side-by-side curtains of air which are of relatively constant velocity across the entire length of the nozzle terminus, particularly as the streams intersect the horizontal array of strands. The uniformity referred to and the relatively constant velocity tends to reduce the tendency of an accidentally broken strand end from whipping wildly to and fro within the furnace. As a consequence of the foregoing, the amount of product and the quality of the product tend to increase since strand contact within the furnace is reduced. Contact between adjacent strands, of course, tends to distrub and even damage the impregnant coverage, leading to inferior product.

It is additionally believed that the uniformity and the relatively constant velocity cooperate with the high velocity of the jet streams in the accomplishment of an important object of the present invention; namely, a reduction in the amount of physical support for the strands. Physical support in the way of guide eyes, pulleys, idler rollers, etc., of necessity require some contact with the strands. Such contact, particularly following immersion pick-up of impregnant and immediately subsequent careful metering of impregnant to the strand as accomplished in the passage of the strand through wiping dies, is undesirable in several ways. Thus, depending on the degree or harshness of contact and the wetness or dryness of the impregnant, the impregnant can be damaged, displaced or, in part, removed from covering relationship with the glass, leading to glass contact and consequent degradation thereof. From the above, it will be appreciated that elimination of contact of the impregnated strands, while the impregnant is still wet, is very advantageous.

The furnace as described herein featuring the alternately upwardly and downwardly jet curtains of air does, when operated as described herein, serve to maintain the horizontally moving array of strands in a suspended state without the need of exterior support, such as guide eyes, guide rollers or the like.

A nozzle spacing of about 3 inches between adjacent nozzles in a horizontal direction and a vertical spacing of about 4 inches between upper and lower nozzle outlets with a nozzle exit air velocity of 9,000 to 12,000 feet per minute has proven satisfactory in maintaining as many as about 72 side-by-side strands suspended in horizontal array for a distance through the overall length of oven 11 measuring 25 feet. Two ovens 11 in series can be employed if desired; in which case, the lineal speed of the strand can be increased as described hereinafter. Even with two ovens, constituting a span of 50 feet, the jet suspension of strands is effective without the necessity of intermediate physical support.

On the basis of the above, it may be noted that the strands in passing through the oven are midway between the upper and lower nozzle outlets or, in other words, 2 inches from each. A given segment of length thus passes through a jet curtain of heated air every 3 inches of lineal travel; the strands being just 2 inches away from the nozzle outlets.

The jet nozzles desirably include, proximate the slot exit 45 and on either side thereof, laterally extending flange or wing members 46. These flange or wing members protect the jet curtain produced by that particular nozzle from disturbance by the jet curtain of air emanating from either of the jet nozzles on the other side of the path of the strand.

Reference to FIG. 3 and the following remarks will constitute and explanation of the phenomena believed to occur. In the first place, the primary jet curtain of air emanating from a given nozzle tends to induce a movement of air along the outer surface of the walls of the jet nozzle in the same direction as the primary jet curtain. This may be referred to as an aspiration. The aspiration air flow induced by the primary jet curtain is not completely vertical as is desired in the primary jet curtain but rather tends to include a movement of air laterally toward the center of the oven. This aspirated air including lateral currents tends to interfere with the primary jet curtain, which is desirably completely vertical, either upwardly or downwardly. At the same time, the jet curtain emanating from adjoining nozzles, after passing the path of the strands, expands towards the exterior surface of the adjoining nozzle walls, magnifying the aspiration effect described. The presence of the flange or wing members 46 in accordance with one embodiment of the present invention, however, disrupts the flow of the aspirated air and prevents its interference with the primary jet curtain of air.

The air emanating from a given nozzle, of course, proceeds swirlingly downwardly or upwardly, depending on whether it is emanating from an upper or lower nozzle, and passes into the collection ductwork encountered; thus, either 21 in the lower region or 23 in the upper region. The ductworks 21 and 23, in fact, are regions of reduced pressure, urging the dissipated jet air to pass thereinto. The somewhat cool dissipated jet air in the lower ductwork 21 passes through generous conduit 24, into the upper ductwork 23 from which it passes through opening 23b, assisted by the exhaust fan 72 into the plenum chamber 70. The air in the plenum chamber is heated to the desired temperature by a burner arrangement 73. It will be appreciated that the description of the flow of air, as set forth above, is meant to refer to the second or aft chamber 11b inasmuch as the reference numerals referred to are connected by appropriate lead lines to the component parts of the aft chamber. It should be understood, of course, that the same flow conditions as described above also exist in the fore chamber 11a, wherein reference to FIG. 1 reveals that the heating plenum chamber above bears the reference numeral 80. Thus, it will be appreciated that the temperature level within the two chambers may be maintained independently of the other.

Generally, it has been found desirable to maintain the temperature in the first or fore chamber at a level of 450°F. to 800°F., while in the second or aft chamber a temperature of from 450°F. to 650°F. is desired.

Inasmuch as the present invention is particularly concerned with effecting, in addition to drying, a partial cure (or partial vulcanization) of impregnant carried by glass strand or cord assemblies, the oven or furnace is desirably controlled in a manner which will confine any of the products of the partial cure or vulacnization to the furnace proper. Thus, vulcanization is necessarily accompanied by the production of gaseous by-products which are quite offensive. To this end, the exhaust system, as governed by fan or blower 72 and motor 73, is controlled so that the volumetric amount of air exhausted by the exhaust collection conduits 21 and 23 is greater in quantity than the amount of heated air furnished to the given chamber by the plurality of jet nozzle members 40. As a consequence, at the exit outlet 19a in end wall 19, there will exist, in fact, a slight negative pressure whereby there is a slight flow of air into the inside of the chamber 11b through the exit outlet 19a.

To avoid flow of products of combustion out the outlet 19a or through the inlet 17a, it has been determined that the exhaust air (passing through opening 23b to plenum 70 or its counterpart opening plenum 80) should exceed the inlet air (all that introduced through the plurality of nozzle members 40 in both chambers) on a volumetric basis, e.g., sufficient to define an exhaust/inlet ratio of about 8 to 5.

In operation of the furnace apparatus under the conditions noted, we have successfully dried and accomplished partial vulcanization of an impregnated cord construction formed of 5–10 strands assembled together with very little twist; each strand in turn being formed of anywhere from several hundred to 400–500 individual filaments. The impregnant which has been employed successfully with satisfactory drying and partial cure is composed of 60 parts by weight Lotol 5440 and 39 parts by weight water. Lotol 5440 is manufactured by Uniroyal, Inc., and is a 38 percent dispersed solids system including a butadiene-styrene-vinyl pyridine terpolymer latex, a butadiene styrene latex and a resorcinol-formaldehyde resin. This impregnant bath has a viscosity just slightly thicker than milk and approaching the thickness of cream.

A 5 to 10 strand assembly constructed as described and bearing a dip-applied coating of the above impregnant is effectively dried under the conditions noted when pulled through the oven at a lineal speed of in the neighborhood of 250–400 feet per minute. With an overall oven length of about 25 feet, it will be appreciated that the residence time of an increment of strand length within the oven, that is, from between inlet 70a and outlet 19a, ranges from 6 seconds (at 250 feet per minute) to 3.75 seconds (at 400 feet per minute); during which time, the increment of strand length passes through about 90 jet curtains of air. As noted previously, half of the jet curtains move upwardly and half of the jet curtains move downwardly, as determined by the position of the nozzles in the manner illustrated in FIGS. 1 and 3. When two ovens are employed in series as referred to hereinabove, the residence time will be double that indicated or, in other words, ranging from about 7½ to about 12 seconds. When two ovens are employed, it is possible to either increase the pulling speed in feet per minute or lower the temperature. An increased pulling speed and consequent increased production is usually more desirable.

As referred to earlier herein, if the elastomeric composed of the impregnant material is exposed to heat alone, it will be observed that an outer skin is formed which retards the rate of drying and partial curing throughout the interior of the overall impregnated strand or cord. The technique in accordance with the present invention, on the other hand, wherein the cord in passing longitudinally through the chamber or furnace is subjected to alternate opposed jet curtains of hot air, results in apparently what may be described as a disruption of the skin or barrier whereby drying proceeds much more rapidly than possible prior to the present technique.

It is a desirable feature of the method and apparatus constituting the present invention that drying and partial vulcanization of impregnant carried by the assembled continuous glass strands is accomplished at high speed and uniformly. Of particular significance is that the partially cured impregnated multiple strand cord or bundle is possessed of two properties which are regarded as acceptable control criteria as to the performance which can be expected of the impregnated cord when located inside of a finely vulcanized rubber product as an interior reinforcement, e.g., as a tire cord or as a belt cord.

One of these control criteria is referred to as "loss on ignition." Desirably, impregnated cord intended for usage as a reinforcement of rubber products should have a value of "loss on ignition" ranging from about 10 percent to about 25 percent. "Loss on ignition" is determined rather simply be weighing a given segment of impregnant cord. The segment is then placed in a chamber maintained at a temperature of about 1300°F. for about 10 minutes in order that essentially the combustible materials are removed, leaving uncombustibles. The segment is then reweighed; the difference in weight permitting a calculation of the value of "loss on ignition." Utilizing the technique as described, impregnated cord is consistently produced which falls within the range indicated.

The other criteria is expressed in terms of adhesion strength in pounds. In this test, one or more lengths of impregnated cord are stretched across the length of the cavity of a dumbbell mold between two strips of unvulcanized rubber, one on either side. A dumbbell is then molded having the cord or cords extending longitudinally through it midway between the dumbbell's facing sufaces. Thereafter, the specimen is pulled apart in an Instron tester with the jaws clamped to hold on the one hand a part of the dumbbell and the cord or cores and the other jaw holding an adjacent portion of the dumbbell so that the tensile pull attempts to strip the dumbbell along its longitudinal axis. Depending upon the number of strands in the dumbbell, the Instron will record a given adhesion value in pounds. This value can be correlated empirically to the degree of partial vulcanization which has been achieved in the drying oven. Furthermore, this empirically determined adhesion value can be utilized to reasonably forecast the performance of the dried, partially cured impregnant-bearing strand as an interior reinforcement. Generally speaking, if the cure has proceeded too far, the cord will not perform satisfactorily as a reinforcement. By the same token, if the cure of partial vulcanization has not proceeded far enough, the impregnated cord will likewise not serve as satisfactorily as one which includes the combination impregnant and coating which is at the proper degree of cure or so-called partial vulcanization. It can be appreciated that, in an extreme case where the elastomeric component of the impregnant was completely cured, the cord including such fully cured impregnant coating will not satisfactorily bond to the adjacent regions of the rubber during the ultimate vulcanization of the rubber product in which it is contained as the interior reinforcement. The method and apparatus as described provides an impregnated cord which consistently yields adhesion values which suggest satisfactory utility as an interior reinforcement for a range of rubber products.

It has been further observed that the jet curtains of air serve to disrupt the boundary layer of air carried by each of the strands along its length as it is moved at the linear velocities of 250 to 400 feet or more per minute. This boundary layer of air carried through the inlet of the oven is, in fact, air at room temperature and tends to insulate the elastomeric impregnant from the drying effect intended by the elevated temperatures. The breaking up this insulating boundary of air by means of the oppositely directed heated jet curtains of air increases the coefficient of heat transfer and consequently contributes to the attainment of the objects enumerated hereinabove.

While the drawings and the foregoing language illustrate and describe the movement of the cords as horizontal, it is within the broad purview of the present invention to provide for movement of the generally mutually parallel array of strands additionally in either a vertical or an inclined path through the oppositely moving curtain-like streams of drying or heating medium since certain, if not all, of the above-enumerated objects of the present invention are accomplished with either of these paths, e.g., vertical or inclined. However, the horizontal movement of the array of strands as previously described is the preferred approach. Thus, in the case of a broken strand, a restarting or rethreading of the broken strand is accomplished more easily when the strands are moving horizontally. Additionally, a horizontal production line which is inclusive of strand supply means, alignment means, impregnation means, drying means and winding means is more conducive to increased throughput and consequent increased production.

It will be appreciated from the foregoing detailed description that a variety of modifications and substitutions may be made to the apparatus described without departing from the scope of the invention and all such obvious departures are intended to be included within the scope of out invention unless such departures are violative of the language of the appended claims.

We claim:

1. A two-stage throttling device adapted to act upon a stream of fluid supplied to an elongate manifold having an elongate exit opening along its length, said device comprising:

walls connecting with said manifold on either side of said opening along its length, each of said walls extending away from said manifold in converging relationship to a terminus defining a slot, said converging walls serving to confine fluid passing from said manifold exit opening to said slot, and an elongate nozzle member located interiorly of said walls proximate said slot, said nozzle including a plurality of side-by-side throat-like passageways having openings of an aggregate area abruptly less than the area defined by said wall spacing proximate said openings and having outlets of an area appreciably less than that of said openings.

2. The device as claimed in claim 1, wherein said nozzle comprises two elongate members adapted for securement in face-to-face abutting relationship, one of said members having a plurality of side-by-side transverse grooves formed in the abutting face thereof, defining said throat-like passageways, said grooves each having a cross-sectional area which generally uniformly decreases along its length, the other of said members being relatively flat, whereby when said members are in secured abutting relationship said other member and said grooves in said grooved member define a plurality of side-by-side linear passageways of uniformly decreasing cross-sectional area.

3. A nozzle assembly adapted and designed for issuance of a defined curtain of drying medium at high velocity and of unidirectional character, said assembly comprising:

an elongate hollow conduit having an elongate outlet longitudinally disposed in the conduit wall, said conduit being connectible to a supply of said drying medium under pressure, and a pair of elongate walls connected to and extending convergingly from said conduit on either side of said outlet to cooperatively define an elongate slot for said curtain, said converging walls confining said drying medium to increase its velocity, said slot additionally featuring a plurality of side-by-side restricting throat-like passages in linear array along the length of said elongate outlet and said slot, said passages having axes normal to said conduit and serving to urge said drying medium unidirectionally, thereby avoiding deviation from the desired defined curtain.

4. The nozzle assembly as claimed in claim 3 which includes elongate laterally extending flanges on either side of said slot.

5. In combination, a pair of elongate planar walls arranged to define a V as viewed in section, the upper spaced edges connecting with an elongate hollow conduit on either side of a longitudinally elongate opening communicating with the interior of said elongate hollow conduit supplied with a gaseous heating medium, such as air, under pressure, said gaseous heating medium being desirably transformed into a unidirectional curtain of high velocity gas, and the lower edges of said V defining a linear slot outlet for said gas, and means dividing said linear slot into a plurality of side-by-side passageways which are generally transverse to said slot, said passageways each featuring a uniformly decreasing cross-sectional area along its axis in the direction of flow of said gaseous heating medium and terminating in an exit, said passageways in aggregate serving to increase the velocity and unidirectional character of said curtain of gas.

6. The combination as claimed in claim 5 which includes elongate laterally extending flanges on either side of said linear slot.

7. The combination as claimed in claim 5, wherein said passageways are each defined by four adjoining walls.

8. The combination as claimed in claim 7, wherein two opposed walls converge in the direction of flow.

9. The combination as claimed in claim 8, wherein the other two opposed walls diverge in the direction of flow.

10. The combination as claimed in claim 9, wherein the converging walls are dominant whereby there is an overall decrease in cross-sectional area of the passageway at the exit.

11. The nozzle assembly as claimed in claim 10 which includes elongate laterally extending flanges on either side of said slot.

12. The combination as claimed in claim 5, wherein said means include (1) an elongate bar mounted along the inner surface of one of said walls proximate said elongate opening, said bar featuring a plurality of side-by-side grooves separated by wedge-shaped walls and (2) an elongate plate carried on the opposite wall and flushly abutting said wedge-shaped walls to complete the definition of said passageways, the wall surfaces of said grooves between separating walls tapering convergingly towards said cover plate to effect a decrease in the cross-sectional area of said passageway along the axial length of said passageway to thereby restrict said gas, thereby increasing velocity and urge said curtain of gas unidirectionally away from said exit.

13. The combination as claimed in claim 12, wherein said wedge-shaped walls taper in a manner that mutually facing surfaces of said wedge-shaped walls diverge in an axially downstream direction, thereby increasing the distance between said walls while at the same time the overall cross-sectional area of the passageways decreases in an axially downstream direction due to the taper of the complementary wall surfaces between separating walls.

* * * * *

UNITED STATES PATENT OFFICE
CERTIFICATE OF CORRECTION

Patent No. 3,827,639   Dated August 6, 1974

Inventor(s) James C. Belue et al.

It is certified that error appears in the above-identified patent and that said Letters Patent are hereby corrected as shown below:

Under the language "UNITED STATES PATENT [19]"

"Relue et al." should read -- Belue et al --; item "[76] Inventors: "James G. Relue" should read -- James C. Belue --; insert -- [73] Assignee: Owens-Corning Fiberglas Corporation, Toledo, Ohio --.

Signed and sealed this 28th day of January 1975.

(SEAL)
Attest:

McCOY M. GIBSON JR.
Attesting Officer

C. MARSHALL DANN
Commissioner of Patents

FORM PO-1050 (10-69)